US012695943B2

(12) United States Patent
Cooper et al.

(10) Patent No.: US 12,695,943 B2
(45) Date of Patent: Jul. 28, 2026

(54) CONTENT RECOGNITION WITH AUDIO FINGERPRINTS WHEN DIALOG ENHANCEMENT IS ENABLED ON PLAYBACK DEVICES

(71) Applicant: The Nielsen Company (US), LLC, New York, NY (US)

(72) Inventors: Timothy Scott Cooper, Oldsmar, FL (US); Mark Charles Ficco, Palm Harbor, FL (US); Alexander Topchy, New Port Richey, FL (US)

(73) Assignee: The Nielsen Company (US), LLC, New York, NY (US)

( * ) Notice: Subject to any disclaimer, the term of this patent is extended or adjusted under 35 U.S.C. 154(b) by 130 days.

(21) Appl. No.: 18/809,616

(22) Filed: Aug. 20, 2024

(65) Prior Publication Data

US 2025/0080801 A1 Mar. 6, 2025

Related U.S. Application Data

(60) Provisional application No. 63/579,500, filed on Aug. 29, 2023.

(51) Int. Cl.
*H04N 21/4402* (2011.01)
*H04N 21/439* (2011.01)

(52) U.S. Cl.
CPC ... *H04N 21/44029* (2013.01); *H04N 21/4394* (2013.01)

(58) Field of Classification Search
CPC ......... H04N 21/44029; H04N 21/4394; H04H 2201/90; G01S 7/52001; G06F 11/3466;

G06F 16/683; G06F 16/90335; G06F 18/22; G06F 21/44; G06K 19/14; G06Q 10/02; G07F 7/1016; H04L 65/611
See application file for complete search history.

(56) References Cited

U.S. PATENT DOCUMENTS

| | | | | |
|---|---|---|---|---|
| 9,113,202 | B1 * | 8/2015 | Wiseman | H04N 21/4394 |
| 11,321,399 | B1 * | 5/2022 | Geertsema | G06F 21/44 |
| 11,641,495 | B2 | 5/2023 | Seo et al. | |
| 2003/0086341 | A1 * | 5/2003 | Wells | G06F 16/683 |
| | | | | 704/E15.045 |

(Continued)

*Primary Examiner* — Gerald Gauthier

(74) *Attorney, Agent, or Firm* — McDonnell Boehnen Hulbert & Berghoff LLP

(57) ABSTRACT

A method and system for helping to facilitate fingerprint-based automatic content recognition when audio may be subject to dialog enhancement (DE). An example method includes, for each of multiple audio time segments, (a) a computing system generating alternate digital reference fingerprint data representing the audio time segment, including at least (i) non-DE reference fingerprint data representing the audio time segment without the audio time segment being dialog enhanced and (ii) DE reference fingerprint data representing the audio time segment with the audio time segment being dialog enhanced and (b) providing the generated alternate digital reference fingerprint data for storage in a reference-fingerprint library for use in fingerprint matching. Including the DE reference fingerprint data may help to facilitate more robust matching of query fingerprint data that represents dialog enhanced audio content.

20 Claims, 5 Drawing Sheets

(56)                 References Cited

U.S. PATENT DOCUMENTS

2010/0131767 A1*  5/2010  Rhoads ................. G07F 7/1016
                                                     713/176
2011/0040780 A1*  2/2011  Rhoads ................. G06K 19/14
                                                     707/769
2014/0172961 A1*  6/2014  Clemmer ............. H04L 65/611
                                                     709/203
2014/0254806 A1*  9/2014  Fonseca, Jr. ........... G10L 25/51
                                                     381/56
2020/0074169 A1*  3/2020  Mukhopadhyay ...... G06F 18/22
2020/0202000 A1*  6/2020  Gross .................. G06F 11/3466
2021/0375276 A1* 12/2021  Pereira .................. G06V 20/46
2023/0358872 A1* 11/2023  Gerdes ............... G01S 7/52001
2024/0281474 A1*  8/2024  Craft ................ G06F 16/90335
2025/0080801 A1*  3/2025  Cooper ........... H04N 21/44029
2025/0307877 A1* 10/2025  Craft ..................... G06Q 10/02

* cited by examiner

Figure 3:
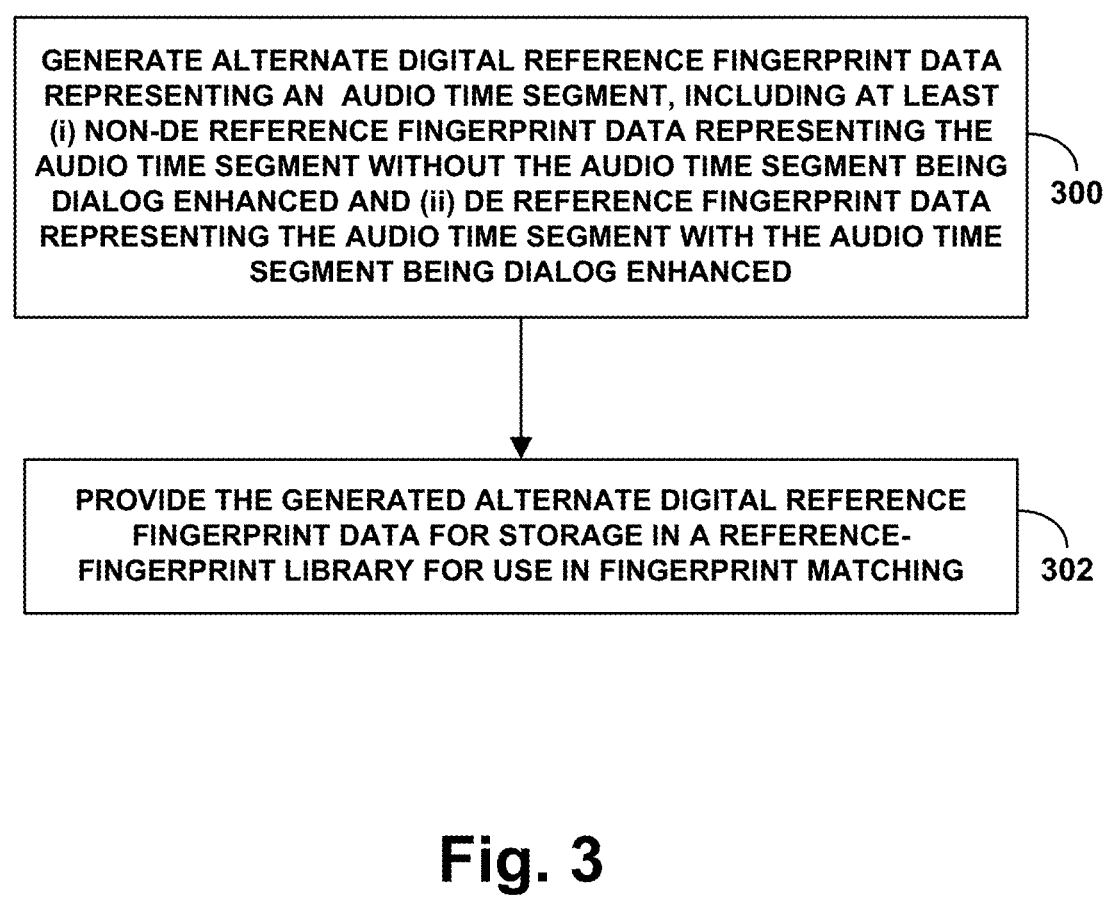

GENERATE ALTERNATE DIGITAL REFERENCE FINGERPRINT DATA REPRESENTING AN  AUDIO TIME SEGMENT, INCLUDING AT LEAST (i) NON-DE REFERENCE FINGERPRINT DATA REPRESENTING THE AUDIO TIME SEGMENT WITHOUT THE AUDIO TIME SEGMENT BEING DIALOG ENHANCED AND (ii) DE REFERENCE FINGERPRINT DATA REPRESENTING THE AUDIO TIME SEGMENT WITH THE AUDIO TIME SEGMENT BEING DIALOG ENHANCED

300

PROVIDE THE GENERATED ALTERNATE DIGITAL REFERENCE FINGERPRINT DATA FOR STORAGE IN A REFERENCE-FINGERPRINT LIBRARY FOR USE IN FINGERPRINT MATCHING

CONTENT RECOGNITION WITH AUDIO FINGERPRINTS WHEN DIALOG ENHANCEMENT IS ENABLED ON PLAYBACK DEVICES

REFERENCE TO RELATED APPLICATION

This application claims priority to U.S. Provisional Patent Application No. 63/579,500, filed Aug. 29, 2023, the entirety of which is hereby incorporated by reference.

SUMMARY

In order to measure the extent to which people of various demographics are exposed to media content presented by media-presentation systems such as televisions, computers, tablets, phones, gaming devices, radios, smart speakers, or other devices, a media-monitoring company can arrange to have media-monitoring devices or "meters" monitor media presentation in representative households or other sites. People who have their media exposure monitored may be considered "panelists," and the places where the monitoring occurs, such as home, offices, or other premises, may be considered "panelist sites."

At each of various panelist sites having a media-presentation system for instance, the media-monitoring company may arrange for a meter to monitor media presentation by that system and to generate query signature data representing the presented media. Further, the media-monitoring company may also operate a computing system, such as a cloud-based computing system, to receive and evaluate this meter-generated query signature data, in order to identify the media presented at the panelist site and thereby to establish associated media-exposure data.

For instance, by evaluating an audio line feed within or into the media-presentation system and/or by evaluating associated acoustic speaker output, a representative meter at a panelist site may be configured to generate digital query fingerprint data representing the audio, and to send the query fingerprint data, along with associated timestamps to the computing system for analysis. Such a meter may also be configured to detect the power on or off state of the media-presentation system, so that the meter can limit its media-presentation monitoring to times when the media-presentation system is on and therefore likely presenting media content being received by the media-presentation system.

The computing system may then be configured to refer to a reference-fingerprint library that maps various pre-established reference fingerprint data to known media content items, in order to determine, based on the meter-reported query fingerprint data, what media content the media-presentation system was presenting at the indicated time. In particular, the computing system may be configured to search through the reference fingerprint data in an effort to find reference fingerprint data that matches the reported query signature data and, upon finding a match with sufficient certainty, to conclude that the media represented by the query signature data is the media to which the matching reference fingerprint data is mapped, and to establish associated media-presentation records for the panelist site.

Further, the computing system may be configured to correlate these media-presentation records with pre-stored demographics of the panelist or panelist site at issue, in order to establish associated media-exposure (e.g., audience-exposure) data, and the computing system may be configured to use this media-exposure data from multiple panelist sites as a basis to establish ratings or measurement statistics that may facilitate commercial processes such as ad placement and other content delivery.

One technical problem that can arise when using audio fingerprints as a basis for content recognition like this is that the audio content as presented by the media-presentation system may not be the same as the audio content that formed the basis for creating the corresponding reference fingerprint data. In particular, this difference in the audio content may exist if the audio content as rendered by the media-presentation system has been subject to dialog enhancement but the audio content that formed the basis for creating the corresponding reference fingerprint data was not subject to dialog enhancement.

Dialog enhancement involves modifying audio content to help emphasize or otherwise enhance voice in the audio content, which may help make the voice (e.g., speech) audio more intelligible.

Traditional consumer devices have special listening modes that seek to achieve dialog enhancement by boosting a mid-frequency range (e.g., 1 to 3.5 kilohertz) possibly regardless of whether the audio at issue actually contains voice. More recently, audio codecs support improved speech clarity by having a media-presentation system (or an associated device) apply dialog enhancement as part of decoding the audio for playout. With the Dolby AC-4 codec, for instance, an encoder may include metadata or other forms of markers in or with the audio bit stream to denote parts where voice (e.g., speech) is present, so a decoder could look for these markers and responsively enhance the dialog by boosting the mix ratio of the dialog to music and/or other background audio. Alternatively, if voice is present as a separate object in object-based audio or a separate dialog channel or commentary channel in multi-channel audio, the decoder could boost the mix level by increasing the level of that object or channel. Further, some media-presentation systems or media streaming services now offer artificial-intelligence-based dialog enhancement that dynamically detects segments containing voice and enhances those segments.

Many fingerprint-generation processes are not invariant with respect to changes in certain frequency bands. Namely, if a given fingerprint-generation process is applied to audio content in order to generate reference fingerprint data representing that audio content, and if the same fingerprint-generation process is applied to the same audio content to generate query fingerprint data after the audio content has been subject to dialog enhancement, the query fingerprint data may not match the reference fingerprint data, or it may otherwise be difficult to match the query fingerprint data with the reference fingerprint data. The extent of the resulting difficulty in matching may depend on the magnitude of the change to the audio and the nature of the fingerprint-generation algorithm. For instance, a fingerprint-generation algorithm that uses most of the spectrum below 4 kHz may be sensitive to modifications of frequency components as may happen with dialog enhancement.

Unfortunately, when attempting to engage in automatic content recognition based on audio fingerprints, dialog enhancement may therefore give rise to many gaps in content identification, where a fingerprint-matching engine is unable to reliably match query fingerprint data to reference fingerprint data and is therefore unable to reliably identify portions of rendered content for purposes of audience-measurement or the like.

The present disclosure provides technical mechanisms that may help to overcome this problem. Namely, the disclosure provides techniques that can help to account for dialog enhancement in the context of audio-fingerprint-based automatic content recognition, particularly to help improve fingerprint matching in situations where audio as rendered by a media-presentation system may have been dialog enhanced.

In one respect, the disclosure provides for generating alternate versions of reference fingerprints representing audio content that may contain voice (e.g., speech). In particular, in a scenario where a reference fingerprint would be generated to represent a given audio content segment, a fingerprint-generation engine could generate multiple different reference fingerprints each representing that same audio content segment, including one reference fingerprint representing the audio segment with no dialog enhancement applied and one or more reference fingerprints each representing the audio content segment with a respective different extent (e.g., type and level) of dialog enhancement applied.

These multiple different reference fingerprints could then be stored as part of the reference-fingerprint library noted above, to facilitate their use in fingerprint-matching. Thereafter, when a fingerprint-matching engine receives query fingerprint data that happens to represent dialog-enhanced audio content, and the fingerprint-matching engine seeks to find reference fingerprint data that matches the query fingerprint data, the fingerprint-matching engine may refer to the reference-fingerprint library and may more likely find a match. At a minimum, this process may help reduce the extent of failure in fingerprint matching as to dialog-enhanced audio content.

In another respect, the disclosure provides for bolstering the fingerprint-matching process when seeking to find a reference-fingerprint match for query fingerprint data representing audio content determined to contain voice. In particular, this may involve determining that certain audio content segments contain voice and, as to query fingerprint data representing those determined audio content segments, responsively applying a fingerprint-matching process that is more granular (and possibly more computationally intensive) than a fingerprint-matching process that would be applied as to query fingerprint data representing audio content not determined to contain voice.

In practice, for instance, the fingerprint-matching engine may generally be configured to apply a relatively low-granularity fingerprint-matching process such as a hash-table-based matching process, for purposes of computing efficiency. Further, the fingerprint-matching engine may be configured to apply a more granular fingerprint-matching process, such as a brute-force bit-by-bit fingerprint matching, as a secondary or follow-on matching process for query fingerprint data as to which the low-granularity fingerprint-matching process did not find a match. With the presently disclosed mechanism, however, the fingerprint-matching engine may determine that a rendered audio content segment represented by query fingerprint data contained voice and, in response, may proceed directly to apply the more granular fingerprint-matching process for matching that query fingerprint data to reference fingerprint data, without first applying the less granular fingerprint-matching process.

These as well as other aspects, advantages, and alternatives, will become apparent to those of ordinary skill in the art by reading the following detailed description, with reference where appropriate to the accompanying drawings. Further, it should be understood that the disclosure provided in this summary and elsewhere in this document is provided by way of example only and that numerous variations and other examples may be possible as well.

BRIEF DESCRIPTION OF THE DRAWINGS

FIG. 3 is a flow chart illustrating an example method.

DETAILED DESCRIPTION

Figure 1:
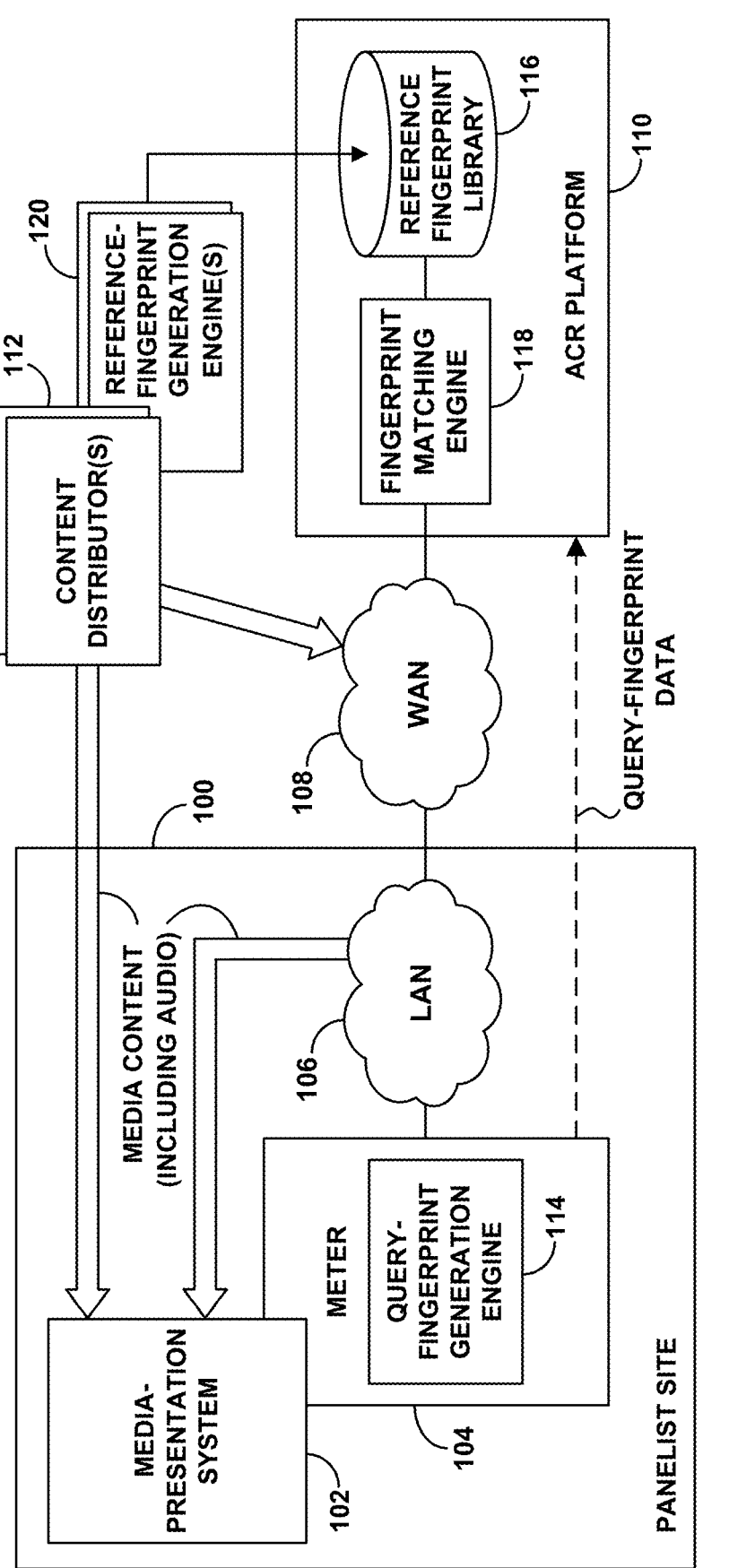
FIG. 1 is a simplified block diagram of an example arrangement in which disclosed features could be implemented.

Referring to the drawings, FIG. 1 is a simplified diagram of an example arrangement in which various disclosed features could be implemented. It will be understood, however, that this and other arrangements and processes disclosed herein are provided by way of example only and could take various other forms. For instance, elements and operations could be re-ordered, re-positioned, distributed, replicated, combined, omitted, added, or otherwise modified. In addition, elements described as functional entities could be implemented as discrete or distributed components or in conjunction with other components/modules, and in any suitable combination and location. Further, various operations described as being carried out by one or more entities could be implemented by and/or on behalf of those entities, through hardware, firmware, and/or software, such as by one or more processing units executing program instructions stored in memory, among other possibilities.

As shown in FIG. 1, the example arrangement includes at a panelist site 100 a media-presentation system 102, a meter 104, and a local area network (LAN) 106, with the LAN 106 providing connectivity with a WAN 108 such as the internet that in turn provides connectivity with an ACR platform 110. Further, the example arrangement also includes one or more content distributors 112 that may deliver media content to the media-presentation system 102 for playout.

With this arrangement, the media-presentation system 102 may receive media content delivered from a content distributor 112, e.g., as a linear broadcast media stream (e.g., a broadcast transport stream) or as non-linear streaming media (e.g., streamed from an Over The Top (OTT) service provider, gaming service provider, or other service) and may present that media content to a panelist. This media content would include audio content, perhaps as an audio track, audio channel, audio object, or otherwise, and may further include other media such as video for instance. Therefore, the media-presentation system 102 may present (e.g., render acoustically) the audio content.

The media-presentation system 102 in this arrangement may be a unitary device such as a television (TV) or may be a combination of devices, such as a TV along with a separate receiver (e.g., set top box, streaming media player, etc.) and/or along with a separate media-output interface such as an audio-visual receiver and/or one or more external sound speakers, among other possibilities.

The meter 104 may be configured to generate query fingerprint data representing the presented audio content. For this purpose, the meter 104 may be inserted in at least an audio line feed within or into the media-presentation system 102 and may include logic configured to analyze the audio content being received by the media-presentation system 102 for playout. Alternatively or additionally, the meter 104 may include a microphone (e.g., microphone array) and associated logic for receiving acoustic audio content output from the media-presentation system 102 and may be configured to analyze that audio content. In some cases, the meter 104 may be integrated with the media-presentation system 102 and/or with one or more other devices.

As shown, the meter 104 may include a query-fingerprint-generation engine 114. This query-fingerprint-generation engine may be configured to generate digital query fingerprints representing the presented audio content, and the meter 104 may be configured to report these generated query fingerprints to the ACR platform 110 for analysis. The query-fingerprint-generation engine may be implemented or controlled by a processing unit (e.g., a microprocessor or digital signal processor (DSP)) of the meter 104.

In practice, the audio content presented by the media-presentation system may define a time sequence of audio ranging from a start of presentation of the audio to an end of presentation of the audio for instance. The query-fingerprint-generation engine 114 may then be configured to generate a corresponding time sequence of query fingerprints representing the audio, such as by generating a new query fingerprint representing each sequential (or sliding-window overlapping) time segment of the audio content, timestamping each query fingerprint according to the time sequence.

The meter 104 may then be configured to report these timestamped query fingerprints to the ACR platform 110 (e.g., to a predefined network address of the ACR platform 110), for post-processing or real-time processing by the ACR platform 110. In an example implementation, for instance, the meter 104 may transmit query fingerprints to the ACR platform 110 in sequential groups at a time, ultimately supplying the ACR platform 110 with a time sequence of the query fingerprints representing each of various analysis durations of the audio content, with each analysis duration being on the order of one hour among other possibilities.

The ACR platform 110 is shown including a reference-fingerprint library 116 and a fingerprint-matching engine 118.

The reference-fingerprint library 116 may hold digital reference fingerprints known to represent audio (e.g., audio tracks) of particular content items (e.g., TV programs, movies, games, etc.), mapping each reference fingerprint to a respective content item and including associated time-stamping as well. Further, the reference-fingerprint data may hold hash tables or the like that may facilitate matching of query fingerprints with reference fingerprints and/or directly mapping of query fingerprints to content items, among other possibilities.

One or more reference-fingerprint-generation engines 120 may be configured to generate these reference fingerprints by analyzing the audio content of various content items, and to provide the timestamped reference fingerprints, along with mapping to the respective content items, for storage in the reference-fingerprint library 116. These reference-fingerprint engines 120 may be implemented or controlled by a processing unit (e.g., a microprocessor or DSP) and may be set to apply the same fingerprint-generation process as the query-fingerprint-generation engine 114. To facilitate generating these reference fingerprints, each reference-fingerprint-generation engine 120 may be implemented in a manner that exposes the reference-fingerprint-generation engine 120 to the audio of known media content items and to identification of those media content items.

For instance, one or more reference-fingerprint-generation engines 120 may be set to receive each of various possible linear broadcast feeds, to generate for each linear broadcast feed an ongoing sequence of timestamped reference fingerprints representing the ongoing linear broadcast feed, and to provide those reference fingerprints, along with mappings to the respective channels and/or to respective content items on those channels (e.g., per electronic program guides or the like), for storage in the reference fingerprint-library 116. Likewise, one or more reference-fingerprint generation engines 120 may be set to ingest and process each of various possible non-linear content items (e.g., programs and movies available for streaming from streaming-media providers), to similarly generate for each non-linear content item a timestamped sequence of reference fingerprints representing the non-linear content item, and to provide those reference fingerprints, along with mappings to the respective content items, for storage in the reference-fingerprint library 116.

The fingerprint-matching engine 118 may then operate to match received query fingerprints with reference fingerprints in the reference-fingerprint library 116, so as to identify content presented by the media-presentation system 102. For instance, the fingerprint-matching engine 118 may be set to carry this out through post-processing, possibly after receiving each sequential analysis-duration's worth of query fingerprints from the meter 104, among other possibilities. Through this process, the fingerprint-matching engine 118 may thereby determine what content the media-presentation system was presenting, and an ACR provider may use this information as a basis to establish ratings statistics or for other purposes, as noted above. The fingerprint-matching engine may similarly be implemented or controlled by a processing unit (e.g., a microprocessor or DSP).

Digital Fingerprint Generation

The query-fingerprint-generation engine 114 and each reference-fingerprint-generation engine 120 may apply any of various processes for generating digital audio fingerprints. Without limitation, for instance, some processes may involve generating fingerprints as a representation of or based on the energy level of frequency components of the audio.

By way of example, a fingerprint-generation process may involve, for each sequential time segment (possibly time-overlapping sliding window time segments, perhaps every 64 ms or 128 ms) of the audio, computing a Discrete Fourier Transform (DFT) such as a Fast Fourier Transform (FFT) of the audio signal, to establish a frequency-domain representation of the signal defining magnitude and thus power respectively for each of various frequency components (frequency bins) of the signal, and on a per frequency-bin basis, assigning a bit indicating whether the power of that bin is higher or lower than the power level of that bin in an immediately preceding time segment. A digital fingerprint of that audio time segment may then be a sequence of those bits corresponding with the sequence of frequency components for instance. Further, as a variation, the process could further involve grouping bin representations together. For instance, if there are 2048 bins, the process may include partitioning the bins into groups of multiple bins each and assigning a representative bit to each group of bins, to produce a more streamlined and possibly robust digital-fingerprint representation of the audio time segment.

As another example, a process may likewise involve, for each sequential segment of the audio, computing a DFT to establish the frequency domain representation of N bins that could be index numbered (e.g., in frequency-component order), defining bin indexes {1 . . . N}, with each index number being of length L bits. The process could then further involve assigning a bit to each bin possibly as noted above, selecting a predefined number M of bins having the highest power level, and generating a digital fingerprint that is a combination of the digital indexes of those highest-power selected bins, which would be of length L*M. For instance, if the number of bins is 2048, then L=11. And if the algorithm selects M=20 highest-power bins from that group and combines the indexes of those bins to establish a representative fingerprint, the fingerprint would be 220 bits long.

As noted above, each fingerprint-generation engine may timestamp each of their generated fingerprints. This time-stamping can indicate a time relationship between finger-prints. For instance, this timestamping could establish a time sequence of fingerprints representing a given sequence of audio content.

Digital Fingerprint Matching

The fingerprint-matching engine 118 may apply various processes as well for matching query digital fingerprints against reference digital fingerprints.

To begin with, in an example implementation, the refer-ence fingerprints and query fingerprints should be generated with the same algorithm as each other, to facilitate their comparison. Further, the reference and query fingerprints might be generated at the same rate as each other, e.g., over the same width sliding window of time as each other to provide a good basis for comparison. A fingerprint-matching engine (e.g., at an ACR server) may then search through the reference fingerprint library in an effort to find a closest match.

One approach for fingerprint-matching is to use hashing, where fingerprint data is fed through a hashing algorithm to establish hash values, and where query fingerprints are effectively matched to reference fingerprints through simple hash-table lookups.

To facilitate an example of hash-based fingerprint match-ing, a computing system may feed each fingerprint through a hashing algorithm to establish a respective hash value. By carrying out this hashing as to all of the reference finger-prints in the reference-fingerprint library, the computing system may establish a hash table that maps resulting hash values to particular content items. Faced with a query fingerprint representing content that was rendered by the media-presentation system 102, the meter 104 or finger-print-matching engine 118 may then carry out the same hashing of that query fingerprint, and the fingerprint-match-ing engine 118 may look up the resulting hash value in the hash table in an effort to find the associated content item.

This hashing could alternatively be done with respect to tuples extracted through a deterministic process from each of the fingerprints. For instance, each fingerprint could be translated through the deterministic process into a set of P tuples, and the computing system may feed each tuple through the hashing algorithm to establish a respective hash value. By carrying out this hashing as to all of the tuples respectively of each of the reference fingerprints in the reference-fingerprint library, the computing system may establish a hash table that maps resulting tuple hash values to particular reference fingerprints and to particular content items. Faced with a query fingerprint representing content that was rendered by a media-presentation system 102, the meter 104 or fingerprint-matching engine 118 may then carry out the same hashing process as to the tuples of that query fingerprint, and the fingerprint-matching engine 118 may look up the resulting tuple hash values in the hash table in an effort to find the associated content item. Further, the fingerprint-matching engine 118 may deem a query finger-print to match a reference fingerprint when at least a predefined threshold percentage of the tuple hash values match.

To make this hash-based matching process more robust, the fingerprint-matching engine could apply the matching process as to bundles of fingerprints, deeming a given bundle of query fingerprints to represent a particular content item if the fingerprint-matching engine finds at least a predefined threshold extent of matching with reference fingerprint data representing that content item.

For instance, given a time sequence of query fingerprints representing an analysis duration (e.g., an hour) of media content rendered by a media-presentation system 102, the meter 104 or fingerprint-matching engine 118 may partition that time sequence of query fingerprints into bundles of S seconds long (e.g., 6, 8, or 10 seconds long), perhaps with the bundles overlapping in time with each other. The fin-gerprint-matching engine could then apply the hash lookup process per query-fingerprint bundle and determine if there is a threshold extent of matching with reference-fingerprint data corresponding with a given content item.

By way of example, if each bundle of query fingerprints includes F fingerprints, the fingerprint-matching engine 118 could perform F lookups. The fingerprint-matching engine 118 could then determine whether at least some predefined threshold percentage of those lookups mapped to the same content item as each other, as a basis for finding that the bundle of query fingerprints represents that particular con-tent item. Alternatively, with the tuple implementation noted above, if there are F fingerprints per bundle and P tuples per fingerprint, then there would be a total of F*P tuples per bundle, and the fingerprint-matching engine 118 could per-form F*P lookups. The fingerprint-matching engine 118 could then determine whether at least some predefined threshold percentage of those lookups mapped to the same content item as each other, similarly as a basis to find that the bundle of query fingerprints represents that particular con-tent item.

Some of these hash-table lookups may result in positive hits. However, other of the hash-table lookups may not result in positive hits. Failure to find positive hit may occur for various reasons, such as due to the presence of noise in the audio, or because hashing may be a lossy process and some hash-table entries may map to multiple reference finger-prints (i.e., a "collision" of reference fingerprints). Further, given a time sequence of query fingerprints in which the vast majority of the query fingerprints are found to match a corresponding time sequence of reference fingerprints rep-resenting the same content as each other, the fingerprint-matching engine 118 may also deem to not be positive hits any time-intervening hits that are not properly in that time sequence or that map to other content.

In an effort to improve fingerprint-based ACR, the fin-gerprint-matching engine 118 may apply a further, second-ary or follow-on, fingerprint-matching process as to any query fingerprints that did not result in positive hash-table hits. This further fingerprint-matching process may be more granular (e.g., more stringent and accurate) than the hash-table-based matching process and may therefore be more computationally-intensive (e.g., requiring more processing cycles and associated energy) than the hash-table-based matching process, but can be reserved for use to help fill in the gaps where the hash-table-based process did not positively map to given content. The query fingerprints in these situations may be considered "weak" in that they did not positively map to reference fingerprints using the less-granular fingerprint-matching process. As such, these query fingerprints may require a more granular, albeit possibly more computationally-intensive, matching process to help get acceptable results.

An example of this more granular process may be a brute-force matching process, namely, searching for a bit-by-bit match between a query fingerprint and a reference fingerprint. For instance, given a query fingerprint of length 220 bits, the fingerprint-matching engine 118 could search through all reference fingerprints in the library (or perhaps just through the reference fingerprints representing earlier-identified content) in an effort to find a 220-bit reference fingerprint that matches sufficiently. For instance, the fingerprint-matching engine 118 could compare the query fingerprint with each reference fingerprint to compute a distance between the two, e.g., as a Hamming distance (number of bits that differ between them). The fingerprint-matching engine 118 could then conclude that a match exists if the distance between the query fingerprint and a given reference fingerprint is no greater than a predefined threshold distance, thereby establishing that the query fingerprint represents the content item known to be represented by the reference fingerprint.

Dialog Enhancement

Various processes for dialog enhancement could be possible as well.

A relatively simple process may take the form of voice equalization, including boosting one or more frequency bands known to be associated with speech, perhaps doing so specifically just as to time segments in which speech is deemed to be present (e.g., as indicated by metadata, or through application of a voice detection algorithm).

More complex dialog enhancement may make use of artificial intelligence processes, e.g., applying a model that is trained to detect and enhance speech where speech is present. With this arrangement in particular, the dialog enhancement may be more complex, in that some parts of dialog may be effected differently than other parts of dialog, among other possibilities.

Some dialog enhancement systems may allow end users to select a dialog-enhancement level or other characteristic, such as "no boost", "low boost", "medium boost", or "high boost". This may trigger differing dialog-enhancement applied by a media-presentation system 102 or, through signaling to an associated content distributor 112, differing dialog-enhancement applied by the content distributor 112, in either case resulting in application of the selected level of dialog enhancement to the audio as played out by the media-presentation system 102.

In a scenario where media content received by the media-presentation system 102 for playout has been subject to dialog enhancement, a transport stream carrying that media content may include metadata that indicates the level of dialog enhancement applied, e.g., on a per time segment basis, among other possibilities. For instance, transport stream packet headers may specify, along the time sequence of the media content, points where dialog enhancement of the audio starts and points where dialog enhancement ends, as well as other information such as the extent of dialog enhancement applied for instance. This may be the case for various types of media content distribution, including but not limited to linear broadcast media and non-linear media (e.g., streaming media).

Improvements to Help Address Impact of Dialog Enhancement on ACR

As noted above, dialog enhancement may play havoc with fingerprint-based ACR. This may be the case, for instance, where the dialog enhancement changes the audio signal in a manner that would factor into the fingerprint generation process, such as if the dialog enhancement changes the energy level of frequency components of the audio and if the fingerprint-generation process is based on those energy levels.

Disclosed are multiple techniques to account for dialog enhancement in the context of fingerprint-based ACR, namely to help improve fingerprint-based ACR in situations where audio rendered by a media-presentation system may have been dialog enhanced.

Generating and Applying Reference Fingerprints with Alternate Versions of Dialog Enhancement One technical solution to account for dialog enhancement is to generate and make available for use in fingerprint matching at least one alternate version of each reference fingerprint as to audio that may be subject to dialog enhancement. In particular, this solution may involve, for at least each audio time segment that may be subject to dialog enhancement, generating and making available for use in fingerprint matching at least (i) a reference fingerprint representing the audio time segment without dialog enhancement, referred to as a "non-DE reference fingerprint," and (ii) a reference fingerprint representing the audio time segment with dialog enhancement, referred to as a "DE reference fingerprint". Further, this solution may involve, for at least each audio time segment that may be subject to any of multiple versions of dialog enhancement (e.g., different types and/or levels of dialog enhancement), generating and making available for use in fingerprint matching at least (i) a non-DE reference fingerprint representing the audio time segment and (ii) multiple versions of DE reference fingerprints each representing the audio time segment, including a DE reference fingerprint respectively for each version of the multiple versions of dialog enhancement.

An ACR provider could generate these alternate versions of reference fingerprints in various ways.

Figure 2:
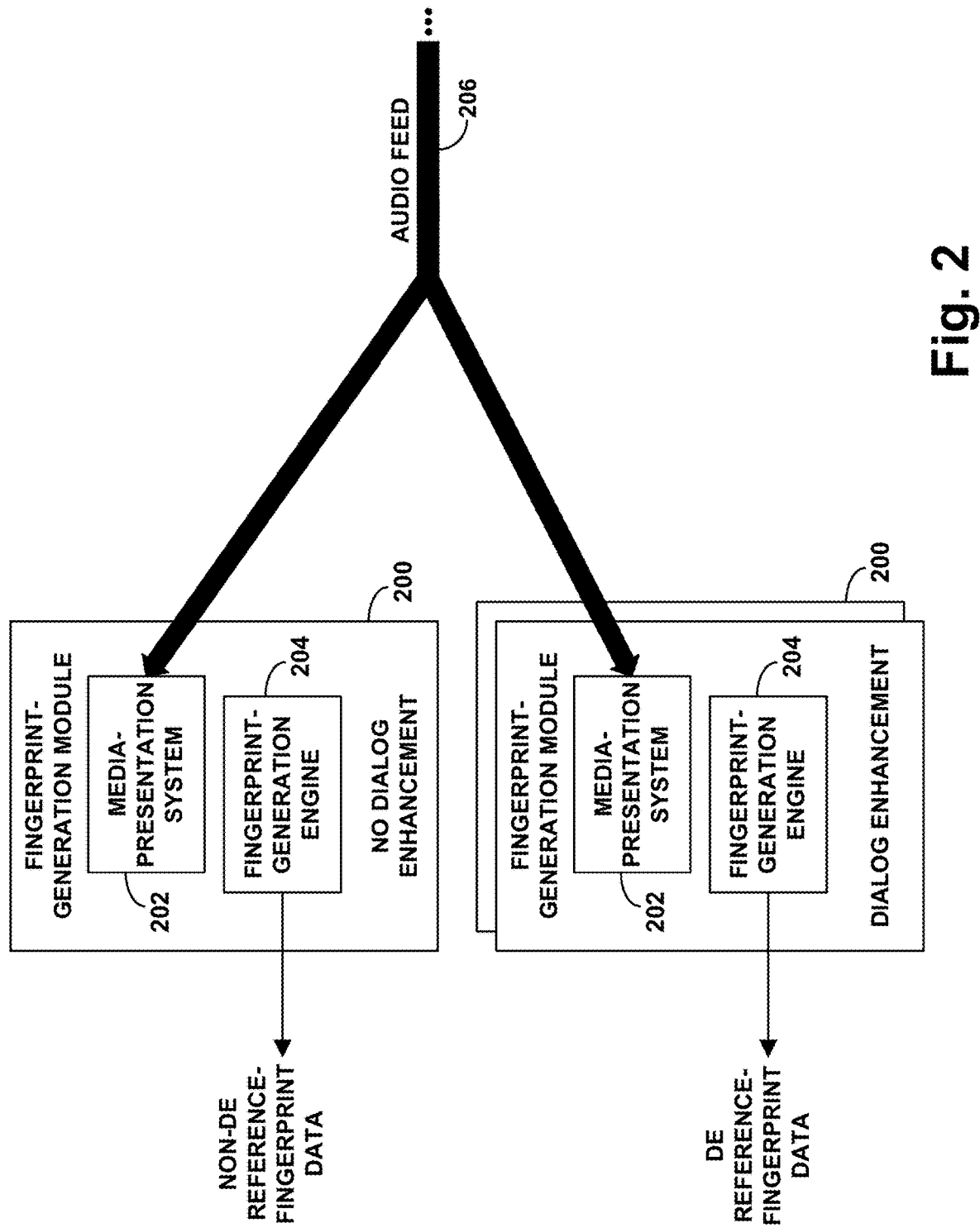
FIG. 2 is a simplified block diagram of a fingerprint-generation system configured to generate alternate reference fingerprint data to help facilitate fingerprint-matching when audio content may be dialog enhanced.

For instance, the ACR provider may operate a fingerprint-generation system that includes a set of modules (e.g., audio players with associated fingerprint-generation engines) each set to operate on the same audio content as each other and each set to apply to the audio content a different respective extent of dialog enhancement ranging from no dialog enhancement to various versions of dialog enhancement and to generate associated reference fingerprints. FIG. 2 is a simplified block diagram illustrating an example of such a system.

As shown in FIG. 2, each of multiple fingerprint-generation modules 200 includes a respective media-presentation system 202 and a respective fingerprint-generation engine 204. Further, these modules 200 are set to receive the same audio content as each other, such as by splitting an audio line feed 206 among the modules. Each module's media-presentation system 202 in this arrangement may be set to apply to the audio a different extent of dialog enhancement than each other module's media-presentation system 202, ranging from no dialog enhancement to various versions (e.g., types and levels) of dialog enhancement, so as to produce respective resulting audio. Further, each module's fingerprint-generation engine 204 may be set to generate reference fingerprints of the resulting audio as discussed above for instance. The resulting reference fingerprints, including, for each audio time segment of the audio content, both a non-DE reference fingerprint and at least one DE reference fingerprint, could then be stored in the reference-fingerprint library 116 to facilitate their use in fingerprint matching.

Alternatively, the fingerprint-generation modules 200 in such a system may be set to receive the same audio as each other but with each module receiving a version of the audio that has been subject to a different extent of dialog enhancement ranging from no dialog enhancement to various versions of dialog enhancement. Each module 200 may then generate reference fingerprints of its received version of the audio as discussed above. And the resulting reference fingerprints, including, for each audio time segment, both a non-DE reference fingerprint and at least one DE reference fingerprint, could then be stored in the reference-fingerprint library 116, to facilitate their use in fingerprint matching.

The fingerprint-generation system may be set to generate DE reference fingerprints just for audio time segments deemed to contain voice (e.g., audio segments that would be subject to dialog enhancement), as determined for instance from associated metadata or through application of a voice-detection algorithm.

For instance, for each audio time segment, a module 200 that is set to apply no dialog enhancement (i.e., a no-DE module) may generate one or more non-DE reference fingerprints, but each module 200 that is set to apply some level of dialog enhancement (i.e., a DE module) may control whether it generates DE reference fingerprints based on an analysis of whether the audio time segment contains voice. By way of example, the fingerprint-generation engine 204 of each DE module may determine whether the audio time segment contains voice by referring to metadata markers as noted above and/or by applying any of various voice-detection algorithms. If the fingerprint-generation engine 204 determines that the audio time segment contains voice, then the fingerprint-generation engine 204 may generate one or more reference fingerprints representing the audio time segment, which would be DE reference fingerprints, for storage in the reference-fingerprint library 116. Whereas, if the fingerprint-generation engine 204 determines that the audio time segment does not contain voice, then the fingerprint-generation engine 204 may forgo generating any reference fingerprints representing the audio time segment, so that the only reference fingerprints generated for the audio time segments would be the non-DE reference fingerprints generated by the non-DE module.

Alternatively, the fingerprint-generation system may implement this logic serially, first checking for presence of voice as a condition for controlling whether to send the audio to the multiple modules or rather to send the audio just to a module that is set to generate a reference fingerprint without application of dialog enhancement. For instance, the fingerprint-generation system may include a computing system programmed to evaluate whether a received audio time segment contains voice and, based on that evaluation, to control whether to provide the audio time segment to any of the DE modules. In particular, if the computing system determines that the audio time segment contains voice, then the computing system may provide the audio time segment to the non-DE module and to each of the DE modules, to facilitate generation of both one or more non-DE reference fingerprints representing the audio time segment and, possibly for each variation of DE, one or more DE reference fingerprints representing the audio time segment. Whereas if the computing system determines that the audio time segment does not contain voice, then the computing system may provide the audio time segment to just the non-DE module to facilitate generation of non-DE reference fingerprints representing the audio time segment, and not to any of the DE modules.

To facilitate these and/or other operations, each module 200 of the fingerprint generation system may include an audio input interface for receiving the audio content, one or more processors (e.g., microprocessors or DSPs), non-transitory data storage (e.g., one or more volatile and/or non-volatile storage components such as flash, optical, magnetic, ROM, RAM, EPROM, EEPROM, etc.), and program instructions stored in the non-transitory data storage and executable by the one or more processors to cause the fingerprint generation system to carry out the operations. Further, each module 200 may include a network interface through which to provide its generated reference fingerprints for storage in the reference-fingerprint library 116.

Provided with these alternate versions of reference fingerprints for each of various content items, the ACR provider may then carry out fingerprint matching as noted above. For instance, the fingerprint-matching engine 118 may receive from the meter 104 query fingerprints representing audio rendered by the media-presentation system 102 and may search through the reference-fingerprint library 116 for matching reference fingerprints. If the audio as rendered by the media-presentation system 102 was not dialog enhanced, then this fingerprint-matching process may find matches with non-DE reference fingerprints. Whereas, if the audio as rendered by the media-presentation system 102 was dialog enhanced, then this fingerprint-matching process may find matches with DE reference fingerprints. This process may therefore help to avoid situations where fingerprint matching fails as a result of the rendered audio having been dialog enhanced.

FIG. 3 is a flow chart illustrating a method that could be carried out accordingly by a computing system, to help improve ACR when dialog enhancement may be present, such as to help facilitate audio fingerprint matching when rendered audio content may be subject to dialog enhancement.

As shown in FIG. 3, at block 300, the method includes a computing system generating alternate digital reference fingerprint data representing the audio time segment, including at least (i) non-DE reference fingerprint data representing the audio time segment without the audio time segment being dialog enhanced and (ii) DE reference fingerprint data representing the audio time segment with the audio time segment being dialog enhanced. Further, at block 302, the method includes providing the generated alternate digital reference fingerprint data for storage in a reference-fingerprint library for use in fingerprint matching.

In line with the discussion above, the act of generating the alternate reference fingerprint data could include generating multiple versions of DE reference fingerprint data each representing the audio time segment, including DE reference fingerprint data respectively for each of multiple versions of dialog enhancement.

Further, as discussed above, the method could also include receiving query fingerprint data representing rendered audio content, and carrying out the fingerprint matching including finding a match between the query fingerprint data and the reference fingerprint data in the reference-fingerprint library.

Still further, as discussed above, the act of carrying out the fingerprint matching could involve (i) if the rendered audio content was not dialog enhanced, then finding a match between the query fingerprint data and the non-DE reference fingerprint data, and (ii) if the rendered audio content was dialog enhanced, then finding a match between the query fingerprint data and the DE reference fingerprint data.

Moreover, as discussed above, the act of carrying out the fingerprint matching could involve (i) making a determination of whether the rendered audio content contained voice, (ii) if the determination is that the rendered audio content did not contain voice, then initially applying a first fingerprint-matching process that has a first level of granularity, and (ii) if the determination is that the rendered audio content contained voice, then, based at least on the determination, initially applying a second fingerprint-matching process that has a second level of granularity higher than the first level of granularity rather than initially applying the first fingerprint-matching process. And here, for instance, the first fingerprint-matching process may involve hash-table-based fingerprint matching, and the second fingerprint-matching process may involve bit-by-bit fingerprint matching.

As further discussed above, the act of generating the alternate digital reference fingerprint data representing the audio time segment could involve applying multiple separate fingerprint-generation modules, including at least one configured to generate the non-DE reference fingerprint data representing the audio time segment and at least one configured to generate the DE reference fingerprint data representing the audio time segment.

Further, as discussed above, the method could also include determining by the computing system that the audio time segment contained voice, in which case the act of generating of the alternate digital reference fingerprint data could be responsive to the determining that the audio time segment contained voice. Moreover, as noted above, the act of determining that the audio time segment contained voice could involve detecting voice in the audio time segment and/or reading metadata that indicates presence of voice in the audio time segment, among other possibilities.

An alternative implementation may make use of technology now known or later developed to remove dialog enhancement from audio. For instance, given an audio time segment that contains voice and that has been modified by application of dialog enhancement, the dialog enhancement could be removed from the modified audio, to largely or fully restore the original, unmodified audio. Once that is done, a computing system could then find that query fingerprint data representing the audio matches non-DE reference fingerprint data, possibly without a need to consider DE reference fingerprint data. Thus, removing applied dialog enhancement may streamline the fingerprint matching process.

Differential Granularity for Fingerprint Matching Depending on Presence of Voice Another technical solution to account for dialog enhancement is to treat the query fingerprints of audio time segments that are deemed to contain voice as being "weak" query fingerprints, and therefore to subject those query fingerprints to a more granular fingerprint-matching process off the bat, without first finding that the query fingerprints did not map to reference fingerprints using a less granular fingerprint-matching process. This solution could be carried out in combination with, or separate from, the above solution.

As noted above, there may be various fingerprint-matching processes, and those processes may have different levels of granularity (e.g., stringency and/or accuracy). Without limitation, for instance, a less granular fingerprint-matching process may be a hash-table-based matching process, and a more granular fingerprint-matching process may be a brute-force bit-by-bit matching process. As further noted above, a more granular fingerprint-matching process may be more computationally-intensive than a less granular fingerprint-matching process and may therefore be generally reserved for use with respect to "weak" query fingerprints, possibly specifically after a less granular fingerprint-matching process fails to map the query fingerprints to reference fingerprints and thus to associated content.

The present technical solution provides for applying the more granular fingerprint-matching process as to query fingerprint data representing audio time segments deemed to contain voice or otherwise deemed to be possibly subject to dialog enhancement. The theory here is that dialog enhancement may change audio content in a way that may adversely impact fingerprint generation as to the content as noted above. Therefore, query fingerprints representing such content may be deemed "weak," similar to query fingerprints that produced no positive hits using a less granular fingerprint-matching process. Given this, the present disclosure provides for the fingerprint-matching engine 118 applying a more granular fingerprint-matching process as to query fingerprint data representing audio content, in response to determining that the audio content may be subject to dialog enhancement, possibly without first applying a less granular fingerprint-matching process as to that query fingerprint data.

Phrased another way, the disclosure provides for selecting a fingerprint-matching process to apply for matching query fingerprint data representing rendered audio content with reference fingerprint data representing known audio content, with the selecting being based on a determination of whether the rendered audio content contained voice. For instance, upon receipt of query fingerprint data representing an audio content segment, the fingerprint-matching engine 118 may initially (and perhaps exclusively) apply a particular fingerprint-matching process in an effort to find reference fingerprint data matching the received query fingerprint data. Per the present disclosure, the fingerprint-matching engine 118 in that scenario could determine whether the audio content segment contained voice and, based on that determination, could select a fingerprint-matching process for that initial application. For example, if the fingerprint-matching engine 118 determines that the audio content segment did not contain voice, then, based at least on that determination (or as a default), the fingerprint-matching engine 118 could opt to initially apply a first fingerprint-matching process. Whereas, if the fingerprint-matching engine 118 determines that the audio content segment contained voice, then, based at least on that determination and based on a second fingerprint-matching process being more granular than the first fingerprint-matching process, the fingerprint-matching engine 118 could instead opt to initially apply the second fingerprint-matching process.

Phrased still another way, the disclosure provides for controlling whether to apply a given fingerprint-matching process for matching query fingerprint data representing rendered audio content with reference fingerprint data representing known audio content, with the controlling being based on a determination of whether the rendered audio content contained voice. For instance, upon receipt of query fingerprint data representing an audio content segment, the fingerprint-matching engine 118 may by default initially apply a first fingerprint-matching process in an effort to find reference fingerprint data matching the received query fingerprint data. Per the disclosure, however, the fingerprint-matching engine 118 may determine that the audio content segment contained voice and, based at least on that determination, may forgo application of the first fingerprint-matching process, proceeding instead directly to application of a second fingerprint-matching process that is more granular than the first fingerprint-matching process.

In practice, the meter 104 that generates and provides query fingerprint data representing the audio content rendered by the media-presentation system 102 may identify segments of the audio content that contained voice and may inform the fingerprint-matching engine 118 accordingly, so that the fingerprint-matching engine 118 can carry out the present processing accordingly.

For example, the meter 104 may apply any of various voice-detection algorithms to determine when voice is present in the audio, and the meter may include associated metadata with the query fingerprint data that the meter 104 reports to the fingerprint-matching engine 118, indicating per query fingerprint or query-fingerprint bundle whether the represented audio content contained voice. Alternatively, if the meter 104 has access to metadata included with the audio content, such as metadata in a transport stream that carries the audio content within or to the media-presentation system 102 for instance, and if that metadata indicates which parts of the audio content contain voice (or which parts are dialog enhanced), the meter 104 may read that metadata to determine when voice is present in the audio (or when the audio is dialog enhanced) and may include corresponding metadata with the query fingerprint data that the meter 104 reports to the fingerprint-matching engine 118. Based on this metadata provided by the meter 104, the fingerprint-matching engine 118 may thus determine whether a given audio content segment represented by query fingerprint data contained voice (or was dialog enhanced), as a basis to control which fingerprint-matching process to apply for matching that query fingerprint data with reference fingerprint data in order to identify the rendered audio content.

Figure 4:
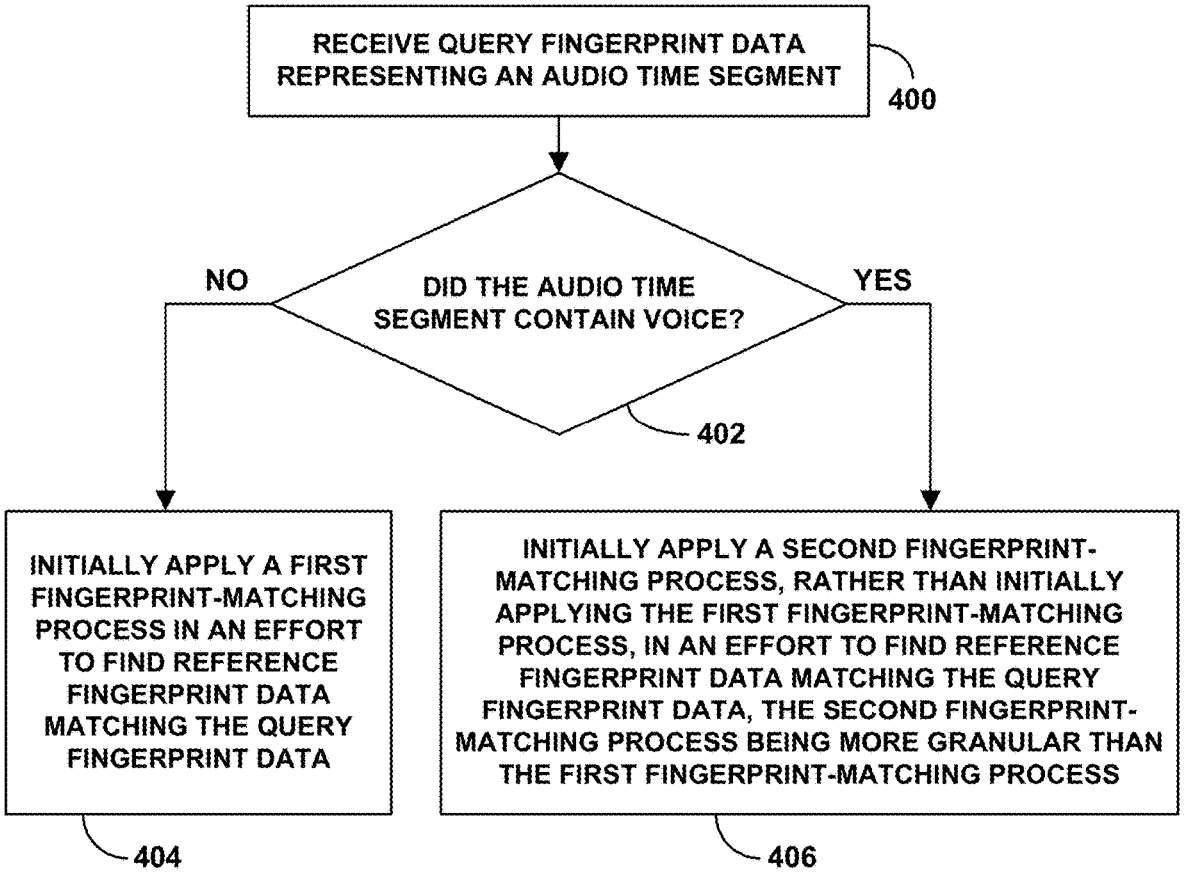
FIG. 4 is a flow chart illustrating another example method.

FIG. 4 is a flow chart illustrating a method that could be carried out accordingly by a computing system, to help improve ACR when dialog enhancement may be present, such as to help facilitate audio fingerprint matching when rendered audio content may be subject to dialog enhancement.

As shown in FIG. 4, at block 400, the method includes a computing system receiving query fingerprint data representing an audio time segment. At block 402, the method then involves the computing system making a determination whether the audio time segment contained voice. If the determination is that the audio time segment did not contain voice, then, at block 404, the method involves the computing system initially (possibly exclusively) applying a first fingerprint-matching process in an effort to find reference fingerprint data matching the query fingerprint data. Whereas, if the determination is that the audio time segment contained voice, then, at block 406, based at least on the determination, the method instead involves the computing system initially applying a second fingerprint-matching process, rather than initially applying the first fingerprint-matching process, in an effort to find reference fingerprint data matching the query fingerprint data, the second fingerprint-matching process being more granular (and perhaps more computationally intensive) than the first fingerprint-matching process In line with the discussion above, the operation at block 406 of initially applying the second fingerprint-matching process in an effort to find reference fingerprint data matching the query fingerprint data could further be based on the second fingerprint-matching process being more granular than the first fingerprint-matching process.

Further, as discussed above, the first fingerprint-matching process may be a hash-table-based fingerprint-matching process, whereas the second fingerprint-matching process may be a bit-by-bit fingerprint matching process.

Still further, as discussed above, the act of the computing system determining whether the audio time segment contained voice could involve he computing system receiving with the query fingerprint data an indication of whether the audio time segment contained voice.

Example Computing System

Figure 5:
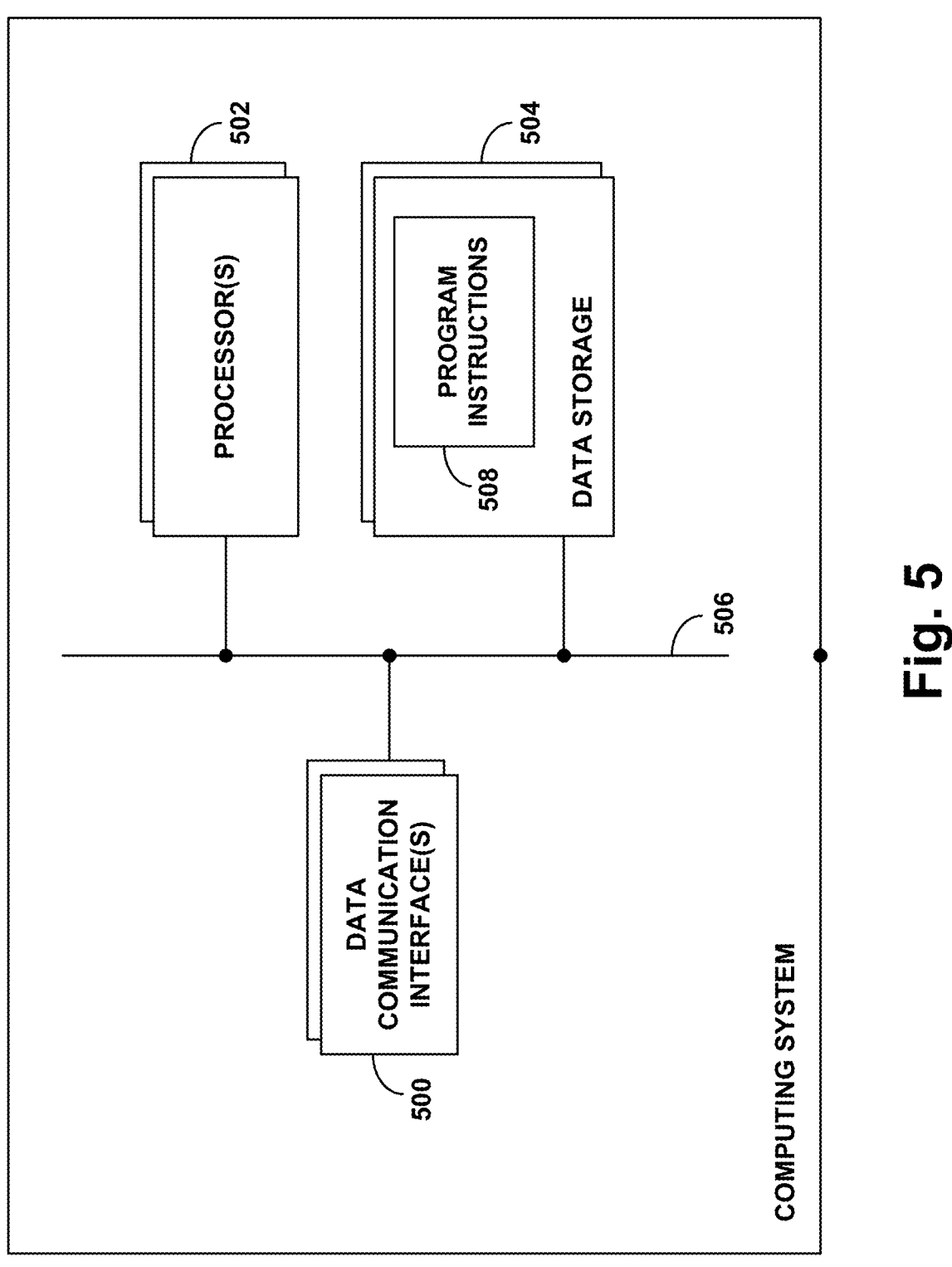
FIG. 5 is a simplified block diagram of a computing system that may carry out various disclosed operations.

FIG. 5 is a simplified block diagram of an example computing system that could be configured to carry out various operations discussed herein. Without limitation, for instance, such a computing system may be implemented as any of the various components shown in FIGS. 1 and 2, and/or cooperatively in multiple components. As shown in FIG. 5, the example computing system includes one or more data communication interfaces 500, one or more processors 502, and non-transitory data storage 504, all of which may be integrated together and/or interconnected together by a system bus, network, or other connection mechanism 506.

The one or more data communication interfaces 500 could enable the computing system to receive and/or send media content, fingerprints, and/or other data. For instance, for media communication, this may include a High-Definition Multimedia Interface (HDMI) interface or wired or wireless network interface (e.g., Ethernet or Wi-Fi). Further, for fingerprint communication, this may include a wired or wireless network interface.

The one or more processors 502 could comprise one or more general purpose processors (e.g., microprocessors) and/or one or more special purpose processors (e.g., DSPs, application specific integrated circuits (ASICs), etc.) Further, the non-transitory data storage 504 could comprise one or more volatile and/or non-volatile storage components (e.g., flash, optical, magnetic, ROM, RAM, EPROM, EEPROM, etc.), and may be integrated in whole or in part with the one or more processors 502. The non-transitory data storage 504 may then store program instructions 508, which could be executable by the one or more processors 502 to carry out various disclosed operations.

The present disclosure also contemplates non-transitory computer-readable data storage (e.g., one or more storage components, such as flash, optical, magnetic, ROM, RAM, EPROM, EEPROM, etc.) having stored thereon program instructions executable by at least one processor to carry out various operations disclosed herein.

Exemplary embodiments have been described above. Those skilled in the art will understand, however, that changes and modifications may be made to these embodiments without departing from the true scope and spirit of the invention.

What is claimed is:

1. A method to help facilitate audio fingerprint matching when rendered audio content may be subject to dialog enhancement (DE), the method comprising, for each of a plurality of audio time segments of a known media-content item:

generating by a computing system alternate digital reference fingerprint data representing the audio time segment, including at least (i) non-DE reference fingerprint data representing the audio time segment without the audio time segment being dialog enhanced and (ii) DE reference fingerprint data representing the audio time segment with the audio time segment being dialog enhanced; and providing the generated alternate digital reference finger-
print data for storage in a reference-fingerprint library
for use in fingerprint matching when later receiving
query fingerprint data representing the audio time seg-
ment, wherein the reference-fingerprint library maps
both the non-DE reference fingerprint data and the DE
reference fingerprint data to the same known media-
content item.

2. The method of claim 1, wherein the generating includes
generating multiple versions of DE reference fingerprint
data each representing the audio time segment, including DE
reference fingerprint data respectively for each of multiple
versions of dialog enhancement.

3. The method of claim 1, further comprising:
receiving query fingerprint data representing rendered
audio content; and
carrying out the fingerprint matching including finding a
match between the query fingerprint data and the
reference fingerprint data in the reference-fingerprint
library.

4. The method of claim 3, wherein carrying out the
fingerprint matching comprises:
if the rendered audio content was not dialog enhanced,
then finding a match between the query fingerprint data
and the non-DE reference fingerprint data; and
if the rendered audio content was dialog enhanced, then
finding a match between the query fingerprint data and
the DE reference fingerprint data.

5. The method of claim 3, wherein carrying out the
fingerprint matching comprises:
making a determination of whether the rendered audio
content contained voice;
if the determination is that the rendered audio content did
not contain voice, then initially applying a first finger-
print-matching process that has a first level of granu-
larity; and
if the determination is that the rendered audio content
contained voice, then, based at least on the determina-
tion, initially applying a second fingerprint-matching
process that has a second level of granularity higher
than the first level of granularity rather than initially
applying the first fingerprint-matching process.

6. The method of claim 5, wherein the first fingerprint-
matching process comprises hash-table-based fingerprint
matching, and wherein the second fingerprint- matching
process comprises bit-by-bit fingerprint matching.

7. The method of claim 1, wherein generating the alternate
digital reference fingerprint data representing the audio time
segment comprises applying multiple separate fingerprint-
generation modules, including at least one configured to
generate the non-DE reference fingerprint data representing
the audio time segment and at least one configured to
generate the DE reference fingerprint data representing the
audio time segment.

8. The method of claim 1, further comprising:
determining by the computing system that the audio time
segment contained voice, wherein the generating of the
alternate digital reference fingerprint data is responsive
to the determining that the audio time segment con-
tained voice.

9. The method of claim 8, wherein determining that the
audio time segment contained voice comprises at least one
operation selected from the group consisting of (i) detecting
voice in the audio time segment and (ii) reading metadata
that indicates presence of voice in the audio time segment.

10. A computing system comprising:
one or more data communication interfaces;
one or more processors;
non-transitory data storage; and
program instructions stored in the non-transitory data
storage and executable by the one or more processors
to carry out operations to help facilitate audio finger-
print matching when rendered audio content may be
subject to dialog enhancement (DE), the operations
comprising, for each of a plurality of audio time
segments of a known media-content item:
generating alternate digital reference fingerprint data
representing the audio time segment, including at
least (i) non-DE reference fingerprint data represent-
ing the audio time segment without the audio time
segment being dialog enhanced and (ii) DE reference
fingerprint data representing the audio time segment
with the audio time segment being dialog enhanced,
and
providing the generated alternate digital reference fin-
gerprint data for storage in a reference-fingerprint
library for use in fingerprint matching when later
receiving query fingerprint data representing the
audio time segment, wherein the reference-finger-
print library maps both the non-DE reference finger-
print data and the DE reference fingerprint data to the
same known media-content item.

11. The computing system of claim 10, wherein the
generating includes generating multiple versions of DE
reference fingerprint data each representing the audio time
segment, including DE reference fingerprint data respec-
tively for each of multiple versions of dialog enhancement.

12. The computing system of claim 10, wherein the
operations additionally include:
receiving query fingerprint data representing rendered
audio content; and
carrying out the fingerprint matching including finding a
match between the query fingerprint data and the
reference fingerprint data in the reference-fingerprint
library.

13. The computing system of claim 12, wherein carrying
out the fingerprint matching comprises:
if the rendered audio content was not dialog enhanced,
then finding a match between the query fingerprint data
and the non-DE reference fingerprint data; and
if the rendered audio content was dialog enhanced, then
finding a match between the query fingerprint data and
the DE reference fingerprint data.

14. The computing system of claim 12, wherein carrying
out the fingerprint matching comprises:
making a determination of whether the rendered audio
content contained voice;
if the determination is that the rendered audio content did
not contain voice, then initially applying a first finger-
print-matching process that has a first level of granu-
larity; and
if the determination is that the rendered audio content
contained voice, then, based at least on the determina-
tion, initially applying a second fingerprint-matching
process that has a second level of granularity higher
than the first level of granularity rather than initially
applying the first fingerprint-matching process.

15. The computing system of claim 14, wherein the first
fingerprint- matching process comprises hash-table-based
fingerprint matching, and wherein the second fingerprint-
matching process comprises bit-by-bit fingerprint matching.

16. The computing system of claim 10, wherein generat-
ing the alternate digital reference fingerprint data represent-
ing the audio time segment comprises applying multiple separate fingerprint-generation modules, including at least one configured to generate the non-DE reference fingerprint data representing the audio time segment and at least one configured to generate the DE reference fingerprint data representing the audio time segment.

17. The computing system of claim 10, wherein the operations additionally include:

determining that the audio time segment contained voice, wherein the generating of the alternate digital reference fingerprint data is responsive to the determining that the audio time segment contained voice.

18. The computing system of claim 17, wherein determining that the audio time segment contained voice comprises at least one operation selected from the group consisting of (i) detecting voice in the audio time segment and (ii) reading metadata that indicates presence of voice in the audio time segment.

19. Non-transitory computer-readable data storage having stored thereon program instructions executable by at least one processor to carry out operations to help facilitate audio fingerprint matching when rendered audio content may be subject to dialog enhancement (DE), the operations comprising, for each of a plurality of audio time segments of a known media-content item:

generating alternate digital reference fingerprint data representing the audio time segment, including at least (i) non-DE reference fingerprint data representing the audio time segment without the audio time segment being dialog enhanced and (ii) DE reference fingerprint data representing the audio time segment with the audio time segment being dialog enhanced, and providing the generated alternate digital reference fingerprint data for storage in a reference-fingerprint library for use in fingerprint matching when later receiving query fingerprint data representing the audio time segment, wherein the reference-fingerprint library maps both the non-DE reference fingerprint data and the DE reference fingerprint data to the same known media-content item.

20. The non-transitory computer readable data storage of claim 19, wherein the operations additionally comprise:

determining that the audio time segment contained voice, wherein the generating of the alternate digital reference fingerprint data is responsive to the determining that the audio time segment contained voice.

* * * * *